Patented Aug. 7, 1923.

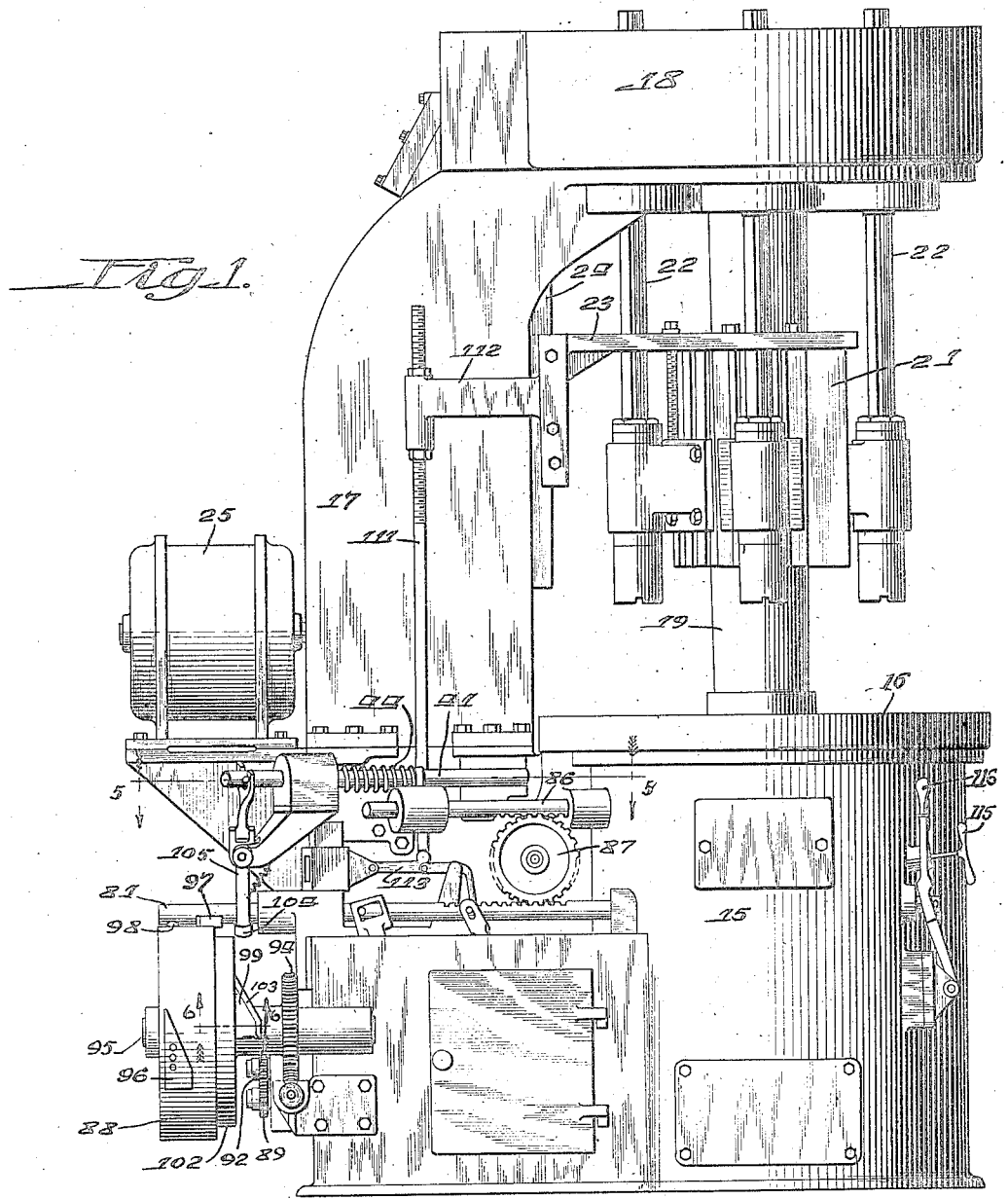

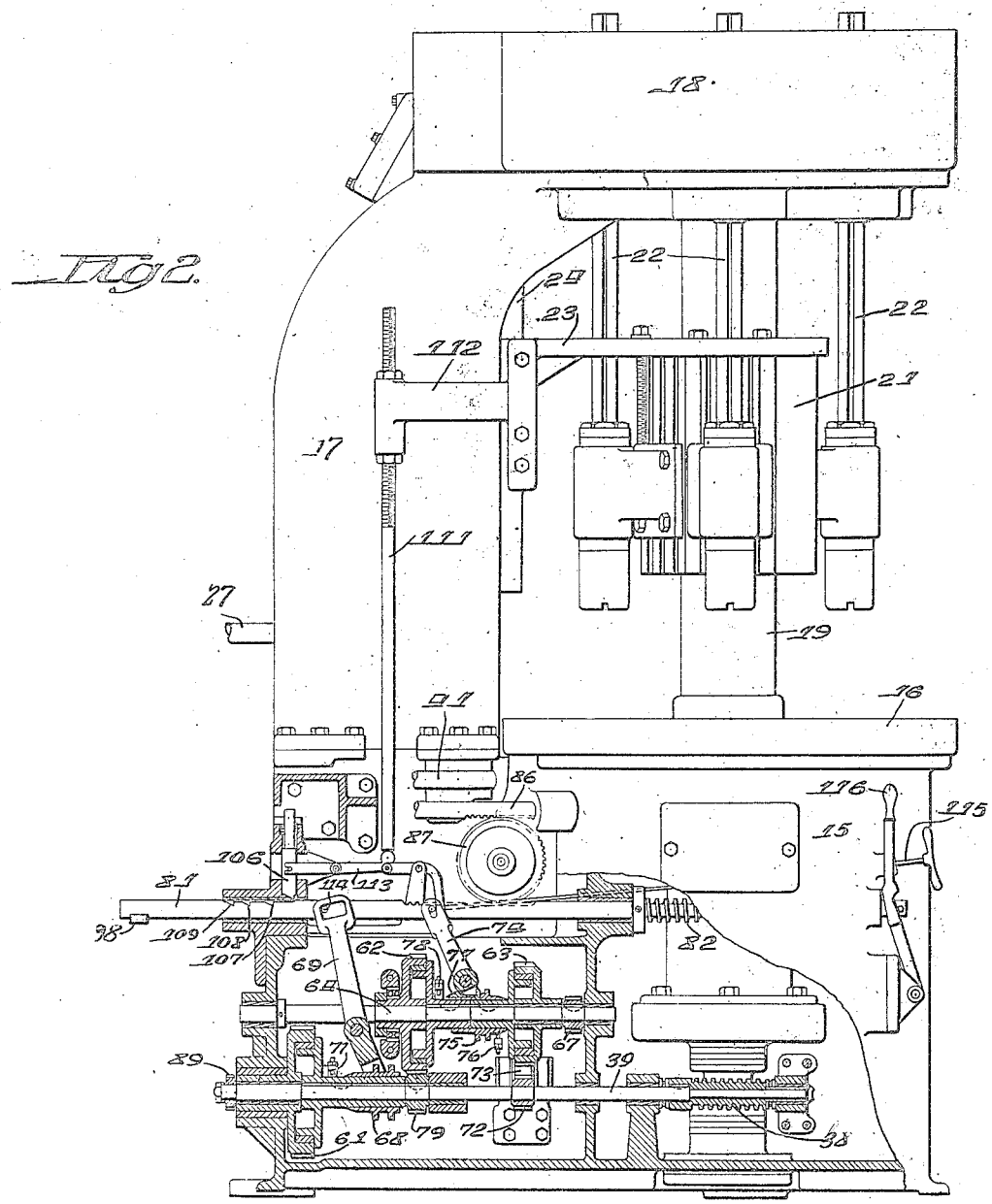

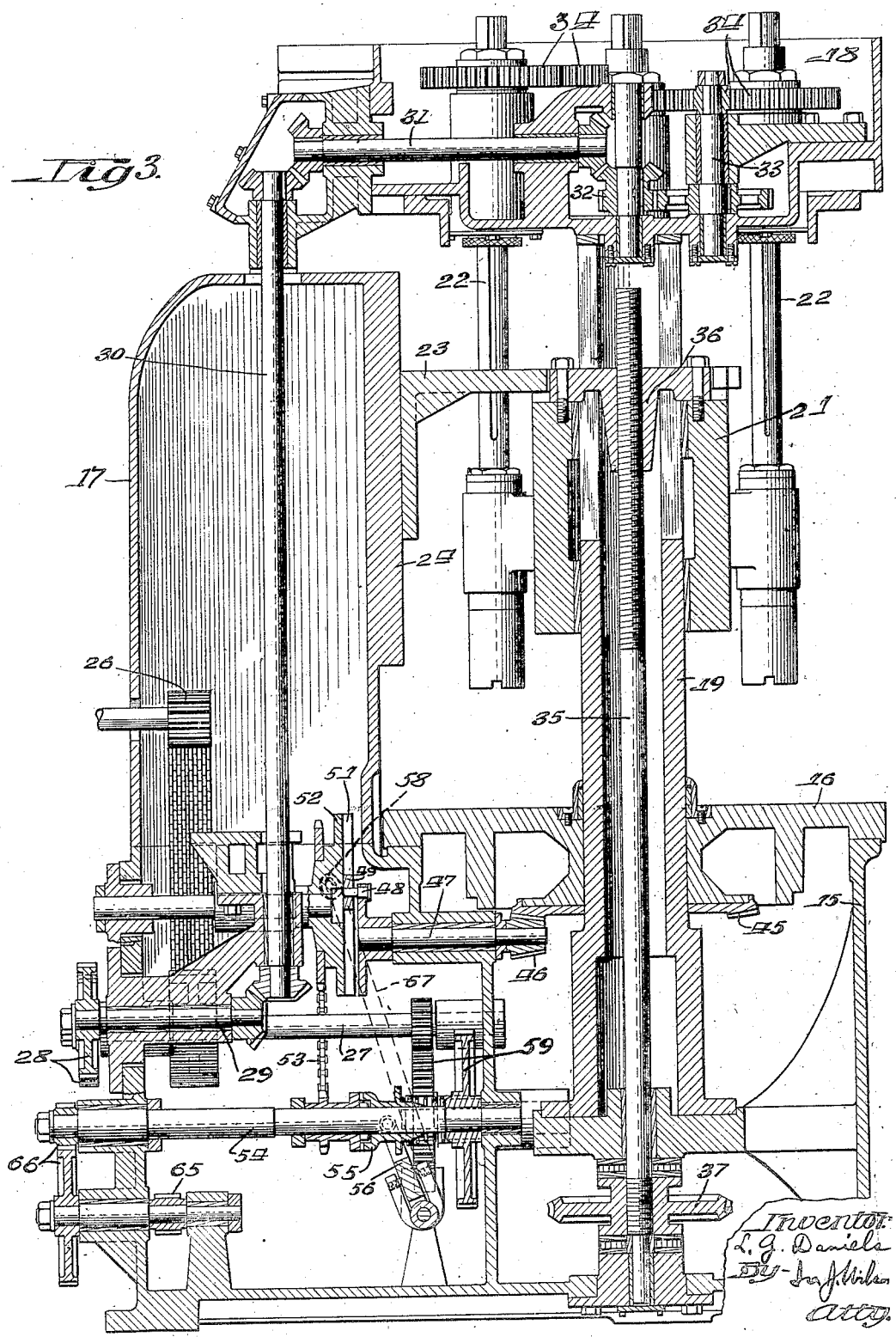

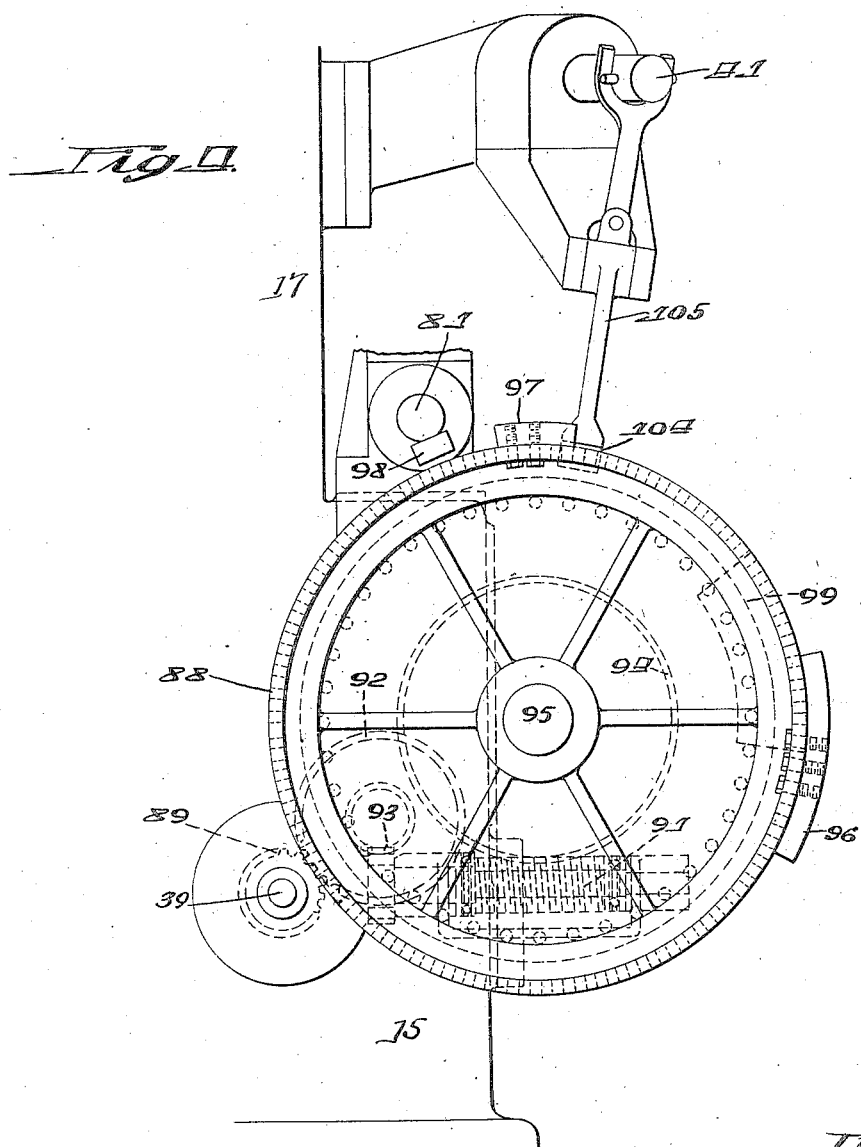

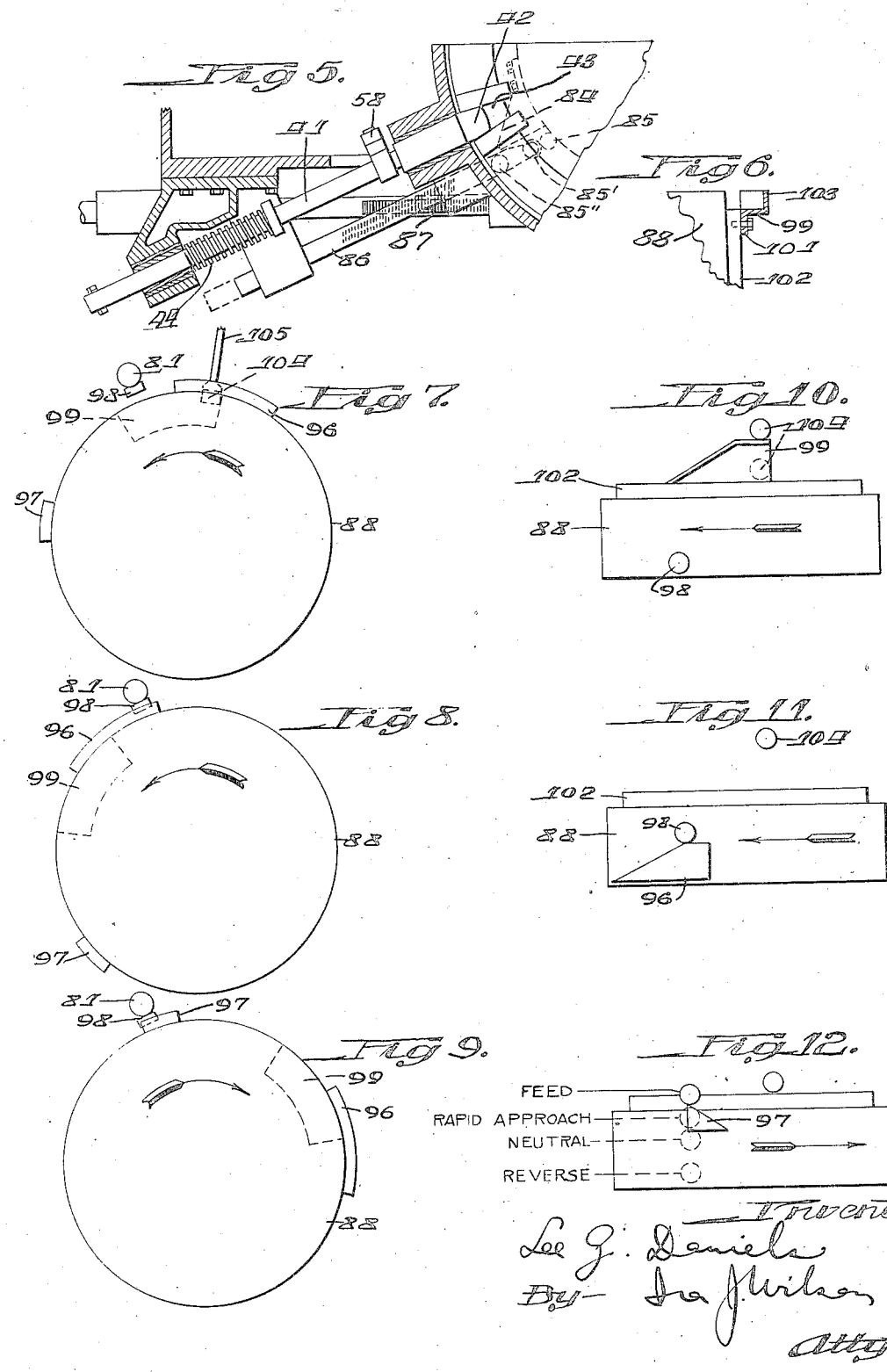

1,464,063

UNITED STATES PATENT OFFICE.

LEE G. DANIELS, OF ROCKFORD, ILLINOIS.

AUTOMATIC MULTIPLE-SPINDLE MACHINE.

Application filed February 26, 1921. Serial No. 447,913.

*To all whom it may concern:*

Be it known that I, LEE G. DANIELS, a citizen of the United States, residing at Rockford, in the county of Winnebago and State of Illinois, have invented certain new and useful Improvements in Automatic Multiple-Spindle Machines, of which the following is a specification.

This invention has reference to automatic multiple spindle metal working machines of that class in which a multiple spindle tool carrier and a work carrier are relatively indexed to successively operate on the work and are further relatively moved in rapid approach, feed, and reverse movements, these operations being performed and controlled automatically. The present invention deals primarily with the mechanism for controlling and effecting these various movements, and in one sense is an improvement on my Patent No. 1,274,857, dated August 6, 1918, and my application Ser. No. 412,946.

The machines disclosed in these prior inventions are peculiar in that the continuous cycle operation including indexing movements and rapid approach, feed and reverse movements are effected through operating mechanism controlled both by movement of the indexing carrier and movement of the receptacle carrier. In the present invention, I utilize these ideas in part and employ in a very advantageous manner an oscillating cam drum control for actuating certain of the operating mechanism. This novel organization promotes accuracy and practicability and facilitates adjustment and setting of the machine for different jobs.

Another important object of my invention is to provide in a tool-operating mechanism a simple and novel means for controlling certain movements, consisting primarily of a cam drum control operating in conjunction with a feed screw.

I have also aimed to provide a simplified and improved automatic control mechanism for machines of the character described with the object to make these machines more practical and durable for the varied line of work for which they are intended.

Further objects and attendant advantages will be appreciated by those skilled in this art as the invention becomes better understood by reference to the following description when considered in connection with the accompanying drawings, in which—

Figure 1 is a side elevation of a multiple spindle machine embodying my invention;

Fig. 2, a side elevation partly in vertical section, showing the clutch mechanism for operating the feed screw;

Fig. 3, an enlarged vertical sectional view centrally through the machine;

Fig. 4, a fragmentary rear view illustrating the cam drum control;

Fig. 5, a fragmentary sectional view taken substantially on the line 5—5 of Fig. 1, showing the table-locking bar and table cam bar;

Fig. 6, a detail sectional view taken on the line 6—6 of Fig. 1;

Figs. 7, 8 and 9, diagrammatic views illustrating different positions of the cam drum; and Figs. 10, 11 and 12, diagrammatic top views of the cam drum corresponding respectively with Figs. 7, 8 and 9.

In illustrating the principles of my invention, I have embodied them in a multiple spindle automatic metal working machine of the type disclosed in my co-pending application. The present machine is a commercial product particularly designed as a labor saving device for automatically performing a number of successive boring, reaming, tapping, facing and turning operations of a widely different nature according to the particular demands of the work piece at hand. It should be understood, however, that the principles of my present invention are in no way limited to use in connection with a machine of the particular type disclosed herein, but that they have a broader application as an automatic control mechanism in the machine tool art.

Briefly stated, the cycle of the particular machine herein disclosed may be as follows: As the machine is shown in the drawings, the tool slide carrying a plurality of tool spindles, has just finished the feed or cutting operation and has started to elevate in its reverse movement, which is termed a rapid reverse. During the reverse, the work carrying table will be indexed to move each work carrier ahead to a new station at which the next succeeding tooling operation will take place. The finished work piece will be carried to an unloading station where it will be removed and a new casting or work piece substituted therefor. The tools and work carriers per se are omitted from the drawings as not being material to the present invention. When the tool slide reaches the proper elevation and while the table is indexing, a cam on the cam drum throws the feed mechanism into a neutral position, stopping the tool slide. The table continues to index and just before completion of its movement a cam on the table actuates the feed mechanism, causing the tool slide to be moved toward the work in a rapid transverse or rapid approach movement. When the tools are in proximity to the work the cam drum causes the tool slide to slow down to a feed movement, which continues until a trip device actuated by direct movement of the tool slide abruptly stops the feed and causes the tool slide to reverse, thus controlling the depth of the tool feed to a fine degree of accuracy. This completes the cycle which will be continued automatically.

The frame or housing may be of any suitable or preferred construction and at present consists of a cylindrical base 15 supporting a revoluble work table 16, and an upright standard 17 at one side of the table supporting an overhead gear housing 18. The work table revolves about a cylindrical column 19 rigidly secured to the base 15 and connected at its upper end with the housing 18. A tool slide 21, mounted for vertical movement on the column 19, carries a plurality of circumferentially spaced tool spindles 22 and is steadied and held in proper alignment by an arm 23 engaging a vertical slideway 24 on the standard 17.

The tool spindles may be revolved by any suitable driving mechanism, and in the present instance they are driven from a motor 25 through a train of gearing, which will be briefly described. The motor pinion 26 drives a shaft 27 which connects through gearing 28 with a shaft 29, and this shaft connects through bevel gearing with vertical and horizontal shafts 30 and 31 respectively, the latter of which drives a gear 32 centrally within the tool spindles. This central gear is in permanent driving connection with the tool spindles through means of intermediate shafts 33 and suitable gearing 34 between the latter and the spindles, as shown in Fig. 3. It follows that when the machine is in operation the spindles will be continuously driven at speeds determined by the ratio of the gearing 34.

The tool slide is moved vertically by a lead or feed screw 35 within the column 19 engaging a nut 36 fixed to the slide. The screw is revolved by a worm wheel 37 fixed to its lower end and driven by a worm 38, which in turn is driven by a feed shaft 39. It will suffice to state that the automatic mechanism described hereinafter for driving this shaft imparts such movement thereto as will produce the rapid approach, feed and reverse movements of the tool slide above referred to.

The work table is normally locked in working position by a locking bar 41, best shown in Fig. 5, from which it will be seen that the bar has a tapered end 42 held in a correspondingly shaped socket 43 in the table by an expansion spring 44, the bar being suitably mounted to slide axially in a radial plane with respect to the table. There is one of these sockets 43 for each work holder, and upon withdrawing the locking bar by operation of the cam drum as will be presently described, this bar will engage a clutch for putting the indexing mechanism into operation. This mechanism indexes the table in a gradually accelerating movement which gradually slackens before the next succeeding socket 43 reaches the locking bar, which enters such socket and stops the table without any sudden jar which is apt to be detrimental to the mechanism. The indexing mechanism may be of any suitable or preferred construction and at present is of a type shown and claimed in my copending application above mentioned. It consists of a bevel gear 45 fixed to the work table and meshing with a pinion 46, which is fixed to a shaft 47 carrying a wrist pin 48 equipped with a slide 49 working in a diametrical slotway 51 in a disk 52. This disk is adapted to be revolved in single revolution movements by a chain connection 53 driven by a clutch on the shaft 54. The shiftable element 55 of this clutch splined to the shaft 54, is adapted to be shifted by a yoke 56 in turn operated by a lever 57 connected at its upper end at 58 to the locking bar 41, as shown in Figs. 3 and 5. The shaft 54 is continuously driven from the motor driven shaft 27 through the agency of an intermediate shaft and gearing 59. It will thus be seen that when the locking bar 41 is withdrawn it will engage the clutch member 55 and revolve the disk 52 in a slow uniform movement, causing the work table to be indexed in an accelerating and then slackening movement by reason of the eccentric slide connection between the shaft 47 and disk 52. The parts are so timed that when the disk 52 has made a complete revolution the locking bar, the nose of which rides on the periphery of the table, will enter the next succeeding socket 43, thereby throwing out the clutch 55 and stopping the table.

Coming now to the mechanism for driving the feed shaft 39 above mentioned, my invention contemplates the provision of any suitable means for driving this shaft at two speeds forward and one reverse in connection with suitable control mechanism for effecting these speeds at the desired times. In the present instance, I employ friction clutch mechanisms somewhat similar to those disclosed in my above mentioned inventions, consisting of a rapid approach, a feed and a reverse clutch, each having a continuously driven member adapted to be connected to the feed shaft 39. Referring to Fig. 2, each of these clutches includes as an element a spur gear, the feed gear 61 being loose on the shaft 39 and the rapid approach gear 62 and reverse gear 63 being loose on the clutch shaft 64. The gear 61 meshes with a drive pinion 65, Fig. 3, which is driven from the shaft 54 through change speed gears 66, while the shaft 64 carrying the shiftable driving elements of the rapid approach and reverse clutches is driven by a gear 67 meshing with one of the gears 59. These clutches are of the type having an expander arm adapted to be actuated by a shiftable cone member for engaging and disengaging the clutch. The feed clutch is connected to the shaft 39 by shifting the cone collar 68 by means of a lever 69 for actuating the expander arm 71. The reverse clutch gear 63 which drives the pinion 72 on the feed shaft 39 through an intermediate reversing gear 73 is adapted to be engaged by operating the lever 74 to shift the collar 75 for operating the expander arm 76. The lever 74 when moved in the opposite direction causes the tapered face 77 on the collar 75 to operate the expander arm 78 for driving the rapid approach gear 62 and consequently driving the feed shaft 39 through the gear 79. Both the shifter levers 69 and 74 are operated by a clutch control rod 81, it being observed that when this rod is moved to the left, as shown in Fig. 2, the reverse clutch 63 will be engaged. When moved to the right, this clutch will be thrown out and the rapid approach clutch 62 engaged, and upon continuing this movement to the right the cam portion 77 on the shifting collar 75 will pass beneath the expander arm 78, releasing the clutch 62. Further movement of the clutch control rod 81 to the right will engage the feed gear 61. Upon returning the rod 81 to the left, the cam member 77 will swing idly past the expander arm 78, without affecting the clutch 62. The construction of this clutch and the one-way cam shifter 77 forms the subject matter of my copending application Serial No. 387,101, and is fully described therein.

The clutch control rod is adapted to be moved to the left under the influence of the spring 82, and to the right by means of cams on the work table. As shown in Fig. 5, the work table is equipped at each station with a cam 84 adapted to engage a roller 85 carried by a sliding bar 86 whose movement is transmitted to the rod 81 through the agency of a rack and gear connection, the gear being represented by 87. I have termed the table cam 84 the rapid approach cam, because it establishes the rapid approach clutch connection.

My invention contemplates the provision of additional mechanism for shifting the clutch control rod 81, consisting of a cam drum 88 in continuous driving connection with the feed shaft 39. This drive is transmitted from the shaft 39 by a gear 89 (Figs. 1 and 4), which drives a worm 91 through the agency of the spur gear 92 and spiral gears 93. The worm 91 meshes with a worm gear 94 fixed to the cam drum shaft 95, which is suitably journaled on the frame and carries the cam drum 88. Inasmuch as the cam drum is in driving connection with the feed shaft 39, the drum will be driven in both directions corresponding to the feed of the tool slide. With the present gearing, the linear travel at the periphery of the cam drum is approximately four times that of the tool slide.

The drum 88 carries on its periphery cam blocks 96 and 97 which I have termed neutral and feed cams respectively. These cam blocks are secured to the drum by bolts and may be adjusted circumferentially thereon to any position desired, sufficient bolt holes being provided for this purpose. These cam blocks are adapted to engage a roller 98 on the locking bar 41 for sliding it inwardly against the pressure of the spring. At its forward side, the drum carries a cam 99 which I have termed the indexing cam. This cam, as shown in Figs. 1 and 6, has a flange 101 bolted to the reduced end 102 of the drum and an outstanding cam rib 103. This cam when moved in a counter-clockwise direction viewing Fig. 4, is adapted to engage the roller 104 and swing the lever 105 in a direction to withdraw the locking bar 41 and engage the indexing clutch as described above. At a certain period in the operation the cam drum reverses and the cam 99 moves past the roller 104, but will have no affect thereon as the roller passes behind the cam rib 103 and swings the lever 105 idly, due to the one-way connection between this lever and the locking bar, plainly shown in Figs. 1 and 4.

The operation of the cam drum and table cam control of the clutch mechanism will now be described. With the parts in the position shown in Figs. 1 to 4 inclusive, the rapid reverse clutch 63 has just been engaged, the tool slide is being reversed and the cam drum is moving in a counter-clockwise direction viewing Fig. 4. The first cam to function is the indexing cam 99, as shown in Figs. 7 and 10, which by action on the roller 104 and lever 105 withdraws the locking bar 41 and engages the indexing clutch 55, causing the table to index in the manner described above. When the tool slide has reached the desired elevation as determined by the position of the cam block 96, this cam will actuate the roller 98 as shown in Figs. 8 and 11 and shift the rod 81 inwardly until the detent 106, Fig. 2, engages a notch 107 in said rod in which position the rod will be held by the spring 82. This action disengages the reverse clutch and withdraws the roller 85 from the innermost position shown in Fig. 5, to the dotted line position 85′, thus bringing the tool slide to rest at what I term the neutral position. The roller in position 85′ will now be moved by the next succeeding table cam 84 to the position 85″, thereby shifting the clutch control rod 81 to engage the rapid approach clutch 62 and causing the rod to be locked in such position by reason of the detent 106 engaging in the notch 108. The feed of the tool slide being thus reversed to approach the work the motion of the cam drum 88 will be accordingly reversed, and the rapid approach movement will continue until the cam block 97 acting on the roller 98, as shown in Figs. 9 and 12, slides the rod 81 inwardly to engage the feed clutch 61, the rod being held in this position by the detent 106 locating in the notch 109, the spring 82 being at this time under its maximum compression. Thus the travel of the tool slide is slackened to a feed movement which will be terminated with considerable accuracy by a trip device which will now be described.

This trip device consists of a trip rod 111 adjustably mounted on an extension 112 of the tool slide, which rod is adapted to actuate a trip lever 113 and raise the detent 106 from the notch 109. Instantly upon such release the clutch rod 81 will be moved to the left with considerable rapidity by the stored up tension of the spring 82, it being observed that by reason of the lost motion connection between the rod 81 and the clutch shifter lever 69, the feed clutch will be instantly engaged, due to the sharp contact of the pin 114 striking the lever after the rod 81 is in motion. In this manner, the cutting depth of the tools is controlled with considerable precision. When the feed clutch is thus disengaged by the action of the tripping device, causing the clutch control rod to be moved to the extreme left position, shown in Fig. 2, the rapid reverse clutch 63 will be substantially simultaneously engaged, causing the tools to be withdrawn from the work, thus completing the general cycle, which will be repeated automatically.

A hand control comprised a pull rod 115 connected to the trip lever 113 and adapted to be actuated to trip the detent 106 similar to the action of the trip rod 111. This control also includes a hand lever 116 having a one-way connection with the rod 81, thus enabling this rod to be shifted for effecting the neutral, rapid approach and feed operations at will.

From the foregoing it will be observed that with the present set of the machine the cam drum oscillates through an arc of about 130 degrees, which obviously will vary according to the position of the cam blocks and the set of the trip devices. It will be further observed that the cams on the drum do not operate to directly transmit movement to the tool slide but that the cam actuates certain control mechanisms which in turn establishes the desired driving connections to the feed screw, which in the present instance are established through the agency of friction clutches. Thus, the oscillating cam drum functions in a novel manner and co-operates in an exceptionally advantageous manner with the control mechanism for the tool and work carriers. It should be understood that my invention comprehends adjusting the several cams and control devices to secure any combination of movements which the present machine is susceptible of producing and also that my invention is in no way limited to the particular arrangement of motion transmitting trains and power transmitting devices (clutches) disclosed herein for purpose of illustration.

It is believed that the objects prefaced above will be readily understood from the foregoing without further description, and it should be manifest that the details of construction illustrated and described may be varied within wide limits without departing from the essence of the invention as defined in the appended claims:

I claim:

1. In a machine tool organization, the combination of an indexing work carrier and a slidable tool carrier, devices for respectively imparting rapid approach, feed and reverse movements to the tool carrier, a shiftable control rod for rendering such devices operative, means actuated by the indexing carrier and tool carrier for effecting certain movements of said control rod, and a cam drum for effecting other movements of the control rod, whereby said rod controls the complete cycle of operation of the tool carrier.

2. In a multiple spindle machine of the character described, the combination of a work carrier and a tool carrier, one adapted to index and the other to feed toward and from the index carrier, mechanism including a plurality of clutches respectively engageable to impart rapid approach, feed and reverse movements to said carrier, and an oscillating cam drum for controlling one of said clutches.

3. In a multiple spindle machine, the combination of a work carrier and a tool carrier, one adapted to index and the other to feed toward and from the index carrier, mechanism for indexing the index carrier, mechanism including a plurality of clutches respectively engageable to impart rapid approach, feed and reverse movements to the feed carrier, and an oscillating cam drum for putting said indexing mechanism into operation and for engaging one of said clutches.

4. In a machine tool organization, the combination of an index work carrier, a multiple spindle tool carrier movable toward and from the work carrier, mechanism controlled in part by the indexing movement of the work carrier for moving the tool carrier and operated by movement of the tool carrier for stopping the feed thereof, and a cam drum for controlling in part the movements of the work and tool carriers.

5. In an automatic metal working machine, the combination of a work carrier and a tool carrier, mechanism for indexing one of the carriers, a series of clutches for moving the other carrier in rapid approach, feed and reverse movements with respect to the index carrier, and an oscillating cam drum carrier for operating said clutches.

6. In an automatic multiple spindle machine, the combination of a work carrier and a tool carrier, mechanism for indexing one of the carriers, a series of clutches for moving the other carrier in rapid approach, feed and reverse movements with respect to the index carrier, a clutch shifting member actuated by a cam on the index carrier for establishing rapid approach movement, a cam drum for operating the clutches to effect feed, indexing and neutral, and an auxiliary trip device put into operation by feed movement of the traveling carrier for effecting the reverse.

7. In a multiple spindle machine of the character described, the combination of an indexing work carrier, a tool carrier movable toward and from the work carrier, mechanism for feeding the tool carrier back and forth including a shiftable control rod for governing the operation thereof, mechanism for indexing the work carrier, a plurality of cams on the index carrier, a rod operable by said cams, and a toothed member operatively connecting said cam rod and shiftable rod for controlling operation of said mechanism by movement of the index carrier.

8. In a multiple spindle machine of the character described, the combination of an index work carrier, a multiple spindle tool carrier movable toward and from the work carrier, mechanism for so moving the tool carrier, and a cam drum driven forwardly and backwardly in timed relation with the forward and backward movements of the tool carrier and controlling in part the operation of said mechanism.

9. In a machine tool organization, the combination of an index work carrier, a tool carrier movable toward and from the work carrier, mechanism for imparting rapid approach, feed and reverse movements to the tool carrier in a complete cycle operation, a cam drum driven in timed relation with the tool carrier in such manner as to be oscillated back and forth through a partial revolution upon a complete cycle of the tool carrier, and means operated by the cam drum for controlling in part the operation of said mechanism.

10. In a machine tool organization, the combination of a work carrier, a tool carrier movable toward and from the same, mechanism for imparting rapid approach, feed and reverse movements to the tool carrier in a complete cycle operation, and a cam drum oscillated forward and backward in partial revolution movements in timed relation with the forward and backward movements of the tool carrier, the cam drum controlling in part the operation of said mechanism.

11. In a multiple spindle machine of the character described, the combination of an index work table, a multiple spindle tool carrier, mechanism for imparting rapid approach, feed and reverse movements to the tool carrier in a complete cycle operation, a cam drum revolved forwardly and backwardly in part revolution movements in timed relation with the forward and backward movements of the tool carrier, and means actuated by the cam drum for operating said mechanism.

12. In a machine tool organization, the combination of a work carrier and a tool carrier one of which is reciprocable with respect to the other to bring the tools and work into and out of operative relation, mechanism for imparting rapid approach, feed and reverse movements to the reciprocable carrier, a cam drum driven in timed relation with said mechanism for controlling operative effects thereof, and a trip device actuated by feed movement of the reciprocable carrier for terminating the feed.

13. In a machine tool organization, the combination of a work carrier and a tool carrier one of which is reciprocable with respect to the other to bring the tools and work into and out of operative relation, mechanism for imparting rapid approach, feed and reverse movements to the reciprocable carrier, a cam drum driven in timed relation with said mechanism for controlling operative effects thereof, a trip device actuated by feed movement of the reciprocable carrier for terminating the feed and effecting the reverse movement, whereby the drive of the drum will be likewise reversed, and a cam on the drum for operating said mechanism during said reverse movement.

14. In a machine tool organization, the combination of a work carrier and a tool carrier one of which is reciprocable with respect to the other to bring the tools and work into and out of operative relation, mechanism for imparting rapid approach, feed and reverse movements to the reciprocable carrier, a cam drum driven in timed relation with said mechanism for controlling operative effects thereof, a trip device actuated by feed movement of the reciprocable carrier for terminating the feed and effecting the reverse movement, whereby the drive of the drum will be likewise reversed, said cam drum being driven by said mechanism in forward and reverse directions according to the direction of travel of said reciprocable carrier, and cams on the cam drum for operating said mechanism during both the forward and reverse drive of the drum.

15. In a multiple spindle machine, the combination of an index work carrier, a reciprocable tool carrier, mechanism for indexing the work carrier, mechanism for imparting rapid approach, feed and reverse movements to the tool carrier including devices independently rendered operative for respectively effecting said movements, a feed shaft for transmitting drive from said devices, and a cam drum driven by said feed shaft so as to oscillate in accordance with the forward and reverse drive of said shaft and for controlling in part the operation of said mechanisms.

16. In a multiple spindle machine, the combination of an index work carrier, a reciprocable tool carrier, mechanism for indexing the work carrier, mechanism for imparting rapid approach, feed and reverse movements to the tool carrier including devices independently rendered operative for respectively effecting said movements, a feed shaft for transmitting drive from said devices, a cam drum driven by said feed shaft, and means actuated by said cam drum for putting the indexing mechanism into operation and for rendering operative one of said devices.

17. In a multiple spindle machine, the combination of an index work carrier, a reciprocable tool carrier, mechanism for indexing the work carrier, mechanism for imparting rapid approach, feed and reverse movements to the tool carrier including devices independently rendered operative for respectively effecting said movements, a feed shaft for transmitting drive from said devices, a cam drum driven by said feed shaft, a cam on the drum, means operated by said cam for putting the indexing mechanism into operation, and means actuated by indexing movement of the work table for rendering operative the rapid approach device.

18. In a multiple spindle machine, the combination of an index work carrier, a reciprocable tool carrier, mechanism for indexing the work carrier, mechanism for imparting rapid approach, feed and reverse movements to the tool carrier including devices independently rendered operative for respectively effecting said movements, a feed shaft for transmitting drive from said devices, a cam drum driven by said feed shaft, a cam on the drum, means operated by said cam for putting the indexing mechanism into operation, means actuated by indexing movement of the work table for rendering operative the rapid approach device, a second cam on the cam drum, and means operated by the second cam for rendering operative said feed device.

19. In a multiple spindle machine, the combination of an index work carrier, a reciprocable tool carrier, mechanism for indexing the work carrier, mechanism for imparting rapid approach, feed and reverse movements to the tool carrier including devices independently rendered operative for respectively effecting said movements, a feed shaft for transmitting drive from said devices, a cam drum driven by said feed shaft, a cam on the drum, means operated by said cam for putting the indexing mechanism into operation, means actuated by indexing movement of the work table for rendering operative the rapid approach device, a second cam on the cam drum, means operated by the second cam for rendering operative said feed device, and a trip device operated by said feed movement of the tool carrier for rendering inoperative said feed device and rendering operative said reverse device.

20. In a multiple spindle machine, the combination of an index work carrier, a reciprocable tool carrier, mechanism for indexing the work carrier, mechanism for imparting rapid approach, feed and reverse movements to the tool carrier including devices independently rendered operative for respectively effecting said movements, a feed shaft for transmitting drive from said devices, a cam drum driven by said feed shaft, a cam on the drum, means operated by said cam for putting the indexing mechanism into operation, means actuated by indexing movement of the work table for rendering operative the rapid approach device, a second cam on the cam drum, means operated by the second cam for rendering operative said feed device, a trip device operated by said feed movement of the tool carrier for rendering inoperative said feed device and rendering operative said reverse device, and a third cam on the cam drum for rendering inoperative said reverse device and causing the tool carrier to stand in a neutral position.

21. In a machine tool organization, a work carrier and a tool carrier, and mechanism for moving one of said carriers relatively to the other to bring the tools into and out of operative relation, including an oscillating cam drum which controls in part the operation of said movable carrier.

LEE G. DANIELS.